P. WAHLMAN.
SUBMERGED FLUID INTAKE.
APPLICATION FILED JUNE 26, 1918.
1,315,615.
Patented Sept. 9, 1919.
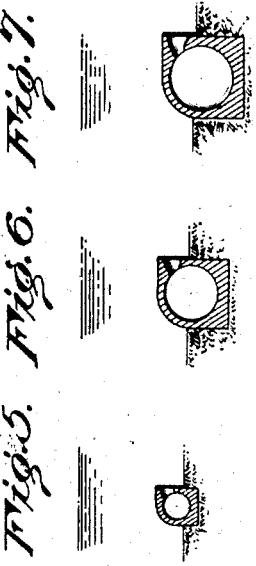
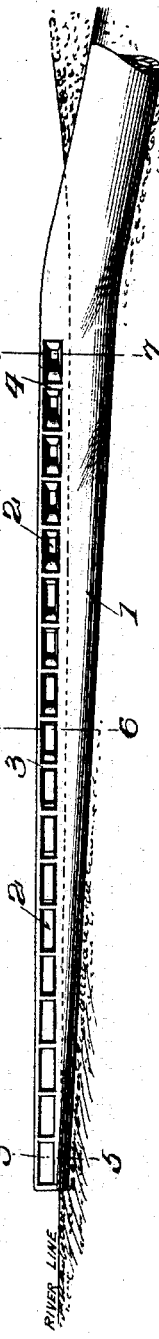
Inventor
P. Wahlman.
By Jac. A. Richmond
Attorney

UNITED STATES PATENT OFFICE.

PETRUS WAHLMAN, OF NEW YORK, N. Y.

SUBMERGED FLUID-INTAKE.

1,315,615.  Specification of Letters Patent.  Patented Sept. 9, 1919.

Application filed June 26, 1918. Serial No. 242,127.

*To all whom it may concern:*

Be it known that I, PETRUS WAHLMAN, a subject of the King of Sweden, residing at New York, in the county of New York and State of New York, have invented certain new and useful Improvements in Submerged Fluid-Intakes, of which the following is a specification.

My invention relates to improvements in submerged fluid intakes.

The principal object is to provide a submerged conduit or intake capable of drawing large quantities of water from comparatively shallow lakes or rivers, such as, for example, Niagara river, which at times carries a great amount of floating ice, and where consequently it is desirable to draw the water from near the bottom and from as large an area as possible in order not to disturb the natural flow of the ice-carrying surface water.

Accordingly, my invention contemplates a conduit or intake of the character and for the purpose stated having a series of fluid openings, of which the areas vary inversely to the drop in the hydraulic gradient existing within the intake. Otherwise stated, the essential characteristic of the invention resides in the design of the intake opening or openings, which, as hereinafter explained, is such that a predetermined quantity of water may be drawn from each particular point. Without this provision the draft of water would not be properly distributed over a sufficiently large area of the lake or river and unnecessary disturbance of surface flow would result.

The conduits forming the intakes are of course submerged and the intake openings are formed with particular relation to the hydraulic gradient existing within the intake; that is to say, the minimum head incident to such hydraulic gradient must be compensated for by the largest opening, while the maximum head is correspondingly compensated for with the smallest opening.

The invention is illustrated in a simple way in the accompanying drawing, in which Figures 1 and 2 represent the reservoir supply and an intake designed therefor, with the hydraulic gradient indicated at $a-b$, Fig. 3 represents a side elevation of an intake with a successive series of fluid openings, a more practical development of the single slot shown in Fig. 2, Fig. 4 is a longitudinal section of the intake, Figs. 5, 6 and 7 are transverse sections on the lines 5—5, 6—6 and 7—7, respectively, of Fig. 3.

The intake is here shown as comprising a conduit 1 of suitable material and sectional area and preferably circular in cross-section.

The conduits, of which any desired number may be used, are arranged to rest on or be partly embedded in the river bottom, and are designed to draw the water from near the bottom and from a comparatively large area in order that the natural flow of surface water be as little disturbed as possible.

In drawing the desired quantity of water without attracting ice and other floating material, that is to say without disturbance of the surface, it is necessary that the intake be designed to distribute the inflow thereto in a manner to draw from as large an area of river or reservoir as possible. Intake openings of uniform size and area will not accomplish this result as the drop in the hydraulic gradient existing within the conduit is maximum at the final inner fluid inlet and the pressure head being therefore greatest at this point such inlet would naturally receive the greatest quantity of water; hence the surface distribution would be unequal, with consequent disturbance.

I have found that if the intake openings are designed with relation to the pressure gradient an even intake can be secured throughout and such intake distributed over a large area with little or no surface disturbance.

The conduit 1 is therefore formed with a series of intake openings 2 of gradually decreasing size or cross-sectional area in the direction of the falling hydraulic gradient. Furthermore these openings are designed so as to avoid unnecessary loss of head in that the walls 3 and 4 are arranged, as shown, to guide the water into the conduit with minimum obstruction.

Fig. 2 illustrates the general plan of the intake opening, here shown as a continuous slot 5, in order that the principle involved in taking care of the uniform intake may be made clear. However, where the conduit or intake is of considerable length, a series of fluid openings is a more practical embodiment of the invention.

It may be desirable to draw more water per linear foot farther away from the shore where the water usually is deeper and in this event the openings can be so designed as to admit more water where the gradient has dropped only slightly and less water per opening farther toward the shore where the gradient has dropped more.

What I claim as new is:—

1. A submerged fluid intake having a series of supply openings relatively sized with relation to the hydraulic gradient within the intake.

2. A submerged fluid intake having a series of supply openings relatively sized with relation to the hydraulic gradient within the intake, with means for minimizing obstruction to the inflow.

3. A submerged fluid intake having a series of supply openings gradually decreasing in size as the hydraulic gradient within the intake drops.

4. A submerged fluid intake having a series of supply openings gradually decreasing in size as the hydraulic gradient within the intake drops, with means for minimizing obstruction to the flow.

5. A submerged fluid intake or conduit of gradually increasing cross-sectional area having a series of fluid supply openings ranging longitudinally thereof and gradually diminishing in area as the hydraulic gradient within the intake drops.

6. A submerged fluid intake or conduit of gradually increasing cross sectional area having a series of fluid supply openings ranging longitudinally thereof and gradually diminishing in area as the hydraulic gradient within the intake drops, with means for minimizing obstruction to the flow.

In testimony whereof I affix my signature.

PETRUS WAHLMAN.

Copies of this patent may be obtained for five cents each, by addressing the "Commissioner of Patents, Washington, D. C."